Patented June 24, 1952

2,601,569

UNITED STATES PATENT OFFICE 2,601,569

AQUEOUS SOLUTION OF RIBOFLAVIN

Chester M. Suter, Albany, N. Y., assignor to Sterling Drug Inc., New York, N. Y., a corporation of Delaware No Drawing. Application April 28, 1951, Serial No. 223,639

4 Claims. (Cl. 167—81)

This invention relates to vitamin compositions and, specifically, to the solubilizing of riboflavin. More particularly, it relates to compositions comprising essentially riboflavin and, as a solubilizer, a non-toxic, water-soluble salt of a hydroxynaphthoic acid. Such compositions encompass those containing riboflavin as the sole dietary or therapeutic factor as well as those containing, in addition to riboflavin, other vitamins, growth factors and medicinals.

Since riboflavin is only very sparingly soluble in water (solubility: 0.013 per cent or 0.013 g. per 100 ml. of water) and other solvents suitable for pharmaceutical preparations, the use of many different agents has been proposed as solubilizing agents for this vitamin in water and in aqueous preparations. While such proposed agents may increase the solubility of riboflavin in water to some extent, the resulting solutions of many of them are not satisfactory for pharmaceutical purposes because of either toxicity or undesirable side effects after oral or parenteral administration, usually because of the large amounts of the solubilizer necessary in proportion to the amount of riboflavin solubilized. In other instances the solutions obtained are unstable and, moreover, the solubilizer itself may decompose.

I have now found that non-toxic, water-soluble salts of hydroxynaphthoic acids markedly increase the solubility of riboflavin in aqueous preparations. The resulting aqueous solutions, which contain considerably less solubilizer in proportion to the amount of riboflavin than in any other aqueous preparation heretofore known, are stable and suitable for oral and parenteral administration. In addition, the preparations of my invention, in having an outstandingly increased percentage of riboflavin compared to known riboflavin-containing aqueous preparations, offer advantages as spraying compositions for fortifying animal feeds, where a relatively high concentration of riboflavin is desired.

Sodium 3-hydroxy-2-naphthoate, because of its low cost and ready availability, is the preferred solubilizing agent according to my invention. Other solubilizing agents encompassed by my invention include other non-toxic, water-soluble salts of 3-hydroxy-2-naphthoic acid as well as non-toxic, water-soluble salts of its isomeric hydroxynaphthoic acids, including, 1-hydroxy-2-naphthoic acid, 4-hydroxy-2-naphthoic acid, 7-hydroxy-2-naphthoic acid, 2-hydroxy-1-naphthoic acid, 4-hydroxy-1-naphthoic acid, 6-hydroxy-1-naphthoic acid, 8-hydroxy-1-naphthoic acid, and the other isomers. Non-toxic, water-soluble salts of these acids which can be used as solubilizers for riboflavin according to my invention include besides the sodium salts also such salts as the potassium, lithium, magnesium, ammonium, organically-substituted ammonium salts, examples of the last-mentioned type including the 2-hydroxyethylammonium salts, the diethylammonium salts, etc., and the like.

In addition to being more effective than any heretofore known compound in its solubilizing action on riboflavin in water and aqueous preparations, sodium 3-hydroxy-2-naphthoate and its related non-toxic, water-soluble salts of 3-hydroxy-2-naphthoic acid and other hydroxynaphthoic acids also possess the advantage of providing an aqueous solution having a pH definitely on the acid side. This is of utmost value in the formulation of aqueous preparations containing, in addition to riboflavin, other dietary factors such as vitamin $B_1$ which is stable in the form of its salts in acid solutions and unstable in alkaline solutions.

The manufacture of my new aqueous solutions of riboflavin generally involves preparing a water solution of a salt of a hydroxynaphthoic acid, preferably sodium 3-hydroxy-2-naphthoate. Riboflavin is then very readily dissolved in such solutions. For solutions of sodium 3-hydroxy-2-naphthoate up to about 10 per cent, this salt was dissolved in water at room temperature. For higher percentages of this salt, up to 13.5 per cent, heating was necessary. When heating was used, the resulting solution of sodium 3-hydroxy-2-naphthoate was preferably cooled to room temperature before addition of the riboflavin and other dietary factors. The final product was then diluted with water to the desired volume.

There can be incorporated in my solubilized riboflavin preparations other water-soluble vitamins such as thiamine hydrochloride, nicotinamide, d-pantothenyl alcohol, vitamin $B_6$ hydrochloride, vitamin C, etc., and other water soluble medicinals as, for instance, pantothenic acid, folic acid, biotin, choline chloride, inositol, etc. Also, there can be incorporated in my aqueous preparations water-insoluble vitamins, such as vitamin A, vitamin $D_2$, vitamin $D_3$, alpha-tocopherol, etc., and/or other water-insoluble ingredients provided, of course, a suitable solubilizing or dispersing agent is added therewith.

My invention further comprehends dry compositions comprising riboflavin and a non-toxic, water-soluble salt of a hydroxynaphthoic acid, preferably sodium 3-hydroxy-2-naphthoate. Such dry compositions, which can be prepared by intimately admixing the ingredients or by freeze-drying my aforesaid aqueous preparations, for instance, according to the method of U. S. Reissue Patent 20,969, are readily soluble in water. Such dry preparations can advantageously be marketed and used when desired by dissolving in water.

Specific embodiments of my aqueous preparations are further illustrated in the following examples.

*Example 1*

A 10.0 per cent solution of sodium 3-hydroxy-2-naphthoate in water was found to dissolve 7.90 per cent of riboflavin. In other words, 100 ml. of a water solution containing 10.0 g. of sodium 3-hydroxy-2-naphthoate dissolved 7.90 g. of riboflavin. The pH of this riboflavin-containing solution was 5.90.

Similarly, 0.5, 1.0, 2.5, and 5.0 per cent solutions of sodium 3-hydroxy-2-naphthoate dissolved, respectively, 0.19, 0.45, 1.43 and 3.60 per cent riboflavin with the resulting solutions having pH values of 6.28, 6.17, 5.92 and 5.88, respectively.

*Example 2*

A composition was prepared containing, in each ml., the following ingredients:

| | Milligrams |
|---|---|
| Riboflavin | 5 |
| Vitamin B₁ hydrochloride | 15 |
| Nicotinamide | 50 |
| Vitamin B₆ hydrochloride | 2.5 |
| Calcium pantothenate | 2.5 |
| Sodium 3-hydroxy-2-naphthoate | 15 |

The above solution was prepared by dissolving the sodium 3-hydroxy-2-naphthoate in water, dissolving the riboflavin in the resulting solution and then adding the other ingredients and shaking the mixture until complete dissolution resulted. Water was then added to the solution to give the desired volume. One hundred ml. of such a solution contains 1.5 g. of sodium 3-hydroxy-2-naphthoate and 0.5 g. of riboflavin.

Similarly, solutions like the foregoing but containing larger quantities of riboflavin can be formulated by using larger amounts of sodium 3-hydroxy-2-naphthoate. In addition, the foregoing preparation can be carried out using in place of sodium 3-hydroxy-2-naphthoate other non-toxic, water-soluble salts of this acid, including the potassium, lithium, magnesium, ammonium, 2-hydroxyethylammonium, diethylammonium salts, and the like.

Aqueous preparations comparable to the foregoing can be obtained by using as the solubilizing agent non-toxic, water-soluble salts of isomeric hydroxynaphthoic acid including sodium 4-hydroxy-2-naphthoate, ammonium 7-hydroxy-2-naphthoate, sodium 2-hydroxy-1-naphthoate, 2-hydroxyethylammonium 3-hydroxy-1-naphthoate, and the like.

*Example 3*

Forty grams of sodium 3-hydroxy-2-naphthoate was dissolved in 300 ml. of water by heating to boiling. The hot solution was filtered, cooled and divided into two portions of 150 ml. each. The pH of these 13.3 per cent solutions of sodium 3-hydroxy-2-naphthoate was 6.8. To one 150 ml. portion was added 5.25 g. of riboflavin which dissolved on shaking. The resulting solution was diluted to 200 ml. with water. Similarly, using the other 150 ml. portion, a 200 ml. solution containing 10.5 g. of riboflavin was prepared. The pH of these two solutions was then adjusted to 6.6 by adding one drop of 1N sodium hydroxide solution. The riboflavin content of these two solutions remained constant after standing for three months at room temperature and at 37° C.

*Example 4*

An 11 per cent solution of sodium 1-hydroxy-2-naphthoate in water was found to dissolve 5 to 6 per cent of riboflavin. Thus, 100 ml. of such a solution contains 11 g. of sodium 1-hydroxy-2-naphthoate and 5 to 6 g. of riboflavin.

*Example 5*

The following formulations are illustrative of polyvitamin compositions containing, in addition to riboflavin and a salt of a hydroxynaphthoic acid, other water-soluble dietary factors as well as one or more water-insoluble dietary factors.

| Ingredient | A | B |
|---|---|---|
| Riboflavin, g | 2.625 | 2.625 |
| Sodium 3-hydroxy-2-naphthoate, g | 10.0 | 10.0 |
| Nicotinamide, g | 1.75 | 1.75 |
| Choline chloride, g | 2.02 | 2.02 |
| d-Pantothenyl alcohol, g | 2.8 | 2.8 |
| Vitamin D₃, g | 0.045 | 0.045 |
| alpha-Tocopherol, g | 0.1 | |
| "Tween 80", g | 10.0 | 10.0 |
| Water q. s., ml | 100 | 100 |

In the preparation of formulation A the riboflavin was dissolved in 75 ml. of a water solution of the solubilizer, sodium 3-hydroxy-2-naphthoate. The nicotinamide, choline chloride and d-pantothenyl alcohol were added to this solution and the mixture shaken until dissolution was complete. The vitamin D₃ and alpha-tocopherol were then dissolved in "Tween 80" (a water-soluble polyoxyethylene sorbitan monooleate), the resulting solution was mixed thoroughly with the aforesaid aqueous solution, water was added to bring the total volume up to 100 ml. and the resulting preparation was agitated until homogeneous.

Formulation B was prepared in the same manner as A except no alpha-tocopherol was used.

Formulations A and B were stored at room temperature and at 37° C. for three months and, when assayed for riboflavin content, were found to contain the original potencies of this vitamin.

Other aqueous riboflavin-containing compositions can be prepared in accordance with the foregoing description by varying the number, quantities and form of dietary or therapeutic ingredients and by adding other desirable substances, e. g., flavoring agents, sweetening agents, etc., provided they are mutually compatible with the other ingredients of the composition.

*Example 6*

Eight parts of sodium 3-hydroxy-2-naphthoate were mixed intimately with four parts of riboflavin. This dry preparation was readily soluble in one hundred parts of water.

Similarly, other dry compositions can be prepared that have incorporated therein other medicinals as disclosed hereinabove.

Alternatively, dry compositions of my invention can be obtained by freeze-drying my aqueous preparations. For example, when the aqueous preparations described above in Example 1 or 2 were frozen and then dehydrated under vacuum while maintained in the frozen state, there were

I claim:

1. An aqueous composition comprising riboflavin in a concentration higher than that obtainable in water alone and a non-toxic, water-soluble salt of a hydroxynaphthoic acid as a solubilizer.

2. An aqueous composition comprising riboflavin in a concentration higher than that obtainable in water alone and a non-toxic, water-soluble, alkali metal salt of a hydroxynaphthoic acid as a solubilizer.

3. An aqueous solution comprising riboflavin in a concentration higher than that obtainable in water alone and sodium 3-hydroxy-2-naphthoate as a solubilizer.

4. A dry vitamin composition comprising riboflavin and a non-toxic, water-soluble salt of a hydroxynaphthoic acid in an amount sufficient to substantially increase the solubility of riboflavin in water whereby the resulting aqueous solution has a concentration of riboflavin higher than that obtainable in water alone, the quantity of the hydroxynaphthoic acid salt being from about one to four times that of the riboflavin.

CHESTER M. SUTER.

REFERENCES CITED

The following references are of record in the file of this patent:

UNITED STATES PATENTS

| Number | Name | Date |
| --- | --- | --- |
| 2,395,378 | Miller | Feb. 19, 1946 |